United States Patent [19]

Starkweather, Jr. et al.

[11] 4,217,430

[45] Aug. 12, 1980

[54] GRAFT COPOLYMER OF NEUTRALIZED ACID COPOLYMER TRUNK AND POLYAMIDE OLIGOMERIC BRANCHES AND METHOD FOR MAKING SUCH COPOLYMER

[75] Inventors: Howard W. Starkweather, Jr., Greenville, Del.; Michael J. Mutz, Fayetteville, N.C.

[73] Assignee: E. I. Du Pont de Nemours and Company, Wilmington, Del.

[21] Appl. No.: 930,602

[22] Filed: Aug. 1, 1978

[51] Int. Cl.$^2$ ............................................. C08L 77/00
[52] U.S. Cl. ................................... 525/183; 525/919
[58] Field of Search ...................... 260/857 L, 857 G; 525/183

[56] References Cited

U.S. PATENT DOCUMENTS

| | | | |
|---|---|---|---|
| 3,264,272 | 8/1966 | Rees | 526/13 |
| 3,388,186 | 6/1968 | Kray | 260/857 G |
| 3,437,718 | 4/1969 | Rees | 260/889 |
| 3,465,059 | 9/1969 | Seven | 260/857 L |
| 3,634,543 | 1/1972 | Sherman | 260/857 L |
| 3,676,400 | 7/1972 | Kohan | 260/857 L |
| 3,845,163 | 10/1974 | Murch | 260/857 L |
| 3,963,799 | 6/1976 | Starkweather | 260/857 L |
| 3,972,961 | 8/1976 | Hammer | 260/857 L |
| 3,976,720 | 8/1976 | Hammer | 260/857 L |
| 4,017,557 | 4/1977 | Hammer | 260/857 L |
| 4,035,438 | 7/1977 | Nielinger | 260/857 G |
| 4,078,014 | 5/1978 | Starkweather | 260/857 L |
| 4,086,295 | 4/1978 | Mori | 260/857 L |

*Primary Examiner*—Paul Lieberman

[57] ABSTRACT

A graft copolymer is disclosed made from a trunk copolymer of ethylene and $\alpha,\beta$-ethylenically unsaturated monocarboxylic acid partially neutralized by zinc, cadmium, or lead ions and from branches of polyamide oligomers. The metal ions facilitate grafting polyamide to monocarboxylic groups.

29 Claims, No Drawings

GRAFT COPOLYMER OF NEUTRALIZED ACID COPOLYMER TRUNK AND POLYAMIDE OLIGOMERIC BRANCHES AND METHOD FOR MAKING SUCH COPOLYMER

BACKGROUND OF THE INVENTION

1. Field of this Invention

This invention relates to graft copolymers derived from trunk copolymers of ethylene and $\alpha,\beta$-ethylenically unsaturated monocarboxylic acids and from grafted branches of polyamide.

2. Description of the Prior Art

Graft copolymers of modified polyolefins and polyamides are well known. Polyamides have been polymerized from monomer in the presence of trunk copolymers. U.S. Pat. No. 3,388,186 discloses formation of a graft copolymer by polymerizing polyamide monomer in a melt of copolymer backbone having active sites for grafting. U.S. Pat. No. 3,465,059 and U.S. Pat. No. 3,634,543 also disclose preparation of graft copolymers by a process of polymerization in the presence of completely-formed backbone copolymer.

Grafting reactions have been disclosed between a polyamide as side chains and certain copolymers of olefin and $\alpha,\beta$-ethylenically unsaturated carboxylic acid as the trunk copolymer. U.S. Pat. No. 4,017,557 discloses such grafting reactions wherein the trunk copolymer contains vicinal reaction sites for grafting attachment of the side chains. U.S. Pat. No. 3,976,720 and U.S. Pat. No. 3,972,961 also disclose grafting reactions which require vicinal acid pairs or acid-ester groups.

U.S. Pat. No. 3,963,799 discloses a blend of polyethylene and polyamide with a graft copolymer of polyamide grafted to vicinal reaction sites in a trunk copolymer of olefin and $\alpha,\beta$-ethylenically unsaturated carboxylic acid. The graft copolymer is said to reduce interfacial free energy of the blend.

Another blend of polymers is disclosed in U.S. Pat. No. 3,676,400 wherein polyamide and unneutralized copolymers of olefin and $\alpha,\beta$-ethylenically unsaturated monocarboxylic acid are milled together. The patent contains no suggestion of graft polymerization.

Neutralization of copolymers including olefins and $\alpha,\beta$-ethylenically unsaturated carboxylic acids is well known. U.S. Pat. No. 3,264,272 discloses such neutralization using a variety of metals and disclosing alkali metals as preferred. U.S. Pat. No. 3,437,718 discloses the use of such neutralized copolymers to compatibilize two other copolymers in a blend. There is no mention of graft polymerization.

U.S. Pat. No. 4,078,014 issued Mar. 7, 1978 on an application filed, June 10, 1976, in the names of the inventors herein, discloses a blend of polyethylene and polyamide with a copolymer of ethylene and neutralized $\alpha,\beta$-ethylenically unsaturated carboxylic acid to serve as a compatibilizing material. It is stated in the body of that patent, that some graft copolymer may be formed by blending the polyamide with the neutralized ethylene-carboxylic acid copolymer.

SUMMARY OF THE INVENTION

According to the present invention there is provided a graft copolymer including a trunk copolymer and side chains or branches; and a process for making the graft copolymer. The trunk of the graft copolymer is an acid copolymer and is derived from ethylene and $\alpha,\beta$-ethylenically unsaturated monocarboxylic acid. The side chains are derived from polyamide oligomers.

A process for making the graft copolymers is also provided wherein some of the carboxylic acid groups on the trunk copolymer are neutralized by reactive contact with certain metal ions and a polyamide is added in reactive contact with the carboxylic groups and in the presence of the metal ions.

DESCRIPTION OF THE INVENTION

The graft copolymer consists essentially of two components: (1) A trunk of partially neutralized acid copolymer, 25 to 80 percent by weight; and (2) side chains of polyamide oligomer, 20 to 75 percent by weight. The presently preferred graft copolymer has 60 to 70 percent by weight acid trunk copolymer and 30 to 40 percent by weight polyamide side chain oligomer.

The acid copolymer contains polymerized units of ethylene and at least one $\alpha,\beta$-ethylenically unsaturated monocarboxylic acid. At least 15 percent and not more than 80 percent of carboxylic acid groups are ionized by neutralization with metal ions selected from the class consisting of zinc, cadmium and lead ions. A preferred range of neutralization is from 35 to 65 percent of the carboxylic acid groups. It is preferred that the degree of neutralization of carboxylic acid groups should be such that the number of unneutralized carboxylic acid groups is equal to or greater than the number of primary amine groups in the polyamide oligomer to be added. While the mechanism of the grafting reaction is not completely understood, it is believed that the grafting reaction occurs only to the extent that there are available unneutralized monocarboxylic acid groups, provided, of course, that there must also be ions of one of the above-named metals present to activate or catalyze the reaction.

Suitable acid copolymers are copolymers comprising polymerized units of ethylene and at least one $\alpha,\beta$-ethylenically unsaturated monocarboxylic acid having from three to eight carbon atoms. Examples of preferred monocarboxylic acids are acrylic acid, methacrylic acid, ethacrylic acid, and the like. The term "monocarboxylic acid", as used in this invention, does not include half-esters of ethylenically unsaturated dicarboxylic acids.

About 3 to about 25, and preferably about 5 to 20, weight percent of the acid trunk copolymer is attributable to the carboxylic acid. The acid copolymer can include polymerized units of another unsaturated monomer such as vinyl acetate or methyl acrylate; but those monomers should not be present in excess of about 20 weight percent. It is not uncommon for the acid copolymer to include about 3 to 4 weight percent of ethyl methacrylate, methyl acrylate, isobutyl methacrylate, or the like.

Neutralization of the carboxylic acid groups is accomplished by metal ions selected from the group consisting of zinc, cadmium and lead. Zinc is the preferred metal ion. Other metals, notably metals such as sodium, mercury, cobalt and copper, have not been found to be useful in the present invention. The carboxylic acid groups are neutralized by establishing a reactive contact between the acid groups and a compound which includes the metal. The neutralization can be accomplished by any of several known means, such as by melt blending the acid copolymer with the metal compound or by combining solutions of the acid copolymer and the metal compound. Melt blending is preferred wherein there is intimate contact between molten trunk copolymer and a compound of the metal ions. The compound which includes the metal ion and which is used to accomplish the neutralization is generally a compound of the metal ion which includes an anion preferably selected from the group consisting of formate, acetate, hydroxide, oxide, nitrate, carbonate, and bicarbonate. Eligible metal compounds should show some degree of ionization in water in order to take effective part in the neutralization reaction.

Acid copolymers can be prepared and neutralized as is disclosed in U.S. Pat. Nos. 3,264,272 and 3,437,718.

The polyamide oligomer should have a degree of polymerization (DP) of about 6–35 which, for polycaprolactam, for example, corresponds to a molecular weight range of about 750–4000. Polyamide oligomers well known in the prior art can be employed and can be derived from a lactam or an omega-amino carboxylic acid and a primary amine such as n-butyl amine or n-hexyl amine or other alkyl amines having 1 to 20, and preferably 3 to 10, carbon atoms in the alkyl group. The preferred polyamide oligomers are polycaprolactam (nylon 6) or polylaurolactam (nylon 12) having a DP of 6–15 and most preferably having a DP of 6–8. Use of a polyamide oligomer having a DP less than 6 results in a graft copolymer which has a poorer properties at temperatures above the melting temperature of the trunk copolymer. Use of oligomers having increasing DP results in graft reactions which are increasingly sluggish or slow and which require progressively more time to react as the DP increases.

The polyamide oligomer is grafted, as side chains, onto the trunk copolymer by an amino group on the oligomer to a carboxylic acid group on the trunk copolymer. The polyamide oligomer is preformed in that the oligomer molecular weight is not intentionally increased during the course of the grafting reaction. Molecules of the oligomer are terminated on one end by a primary amino group to graft onto the trunk copolymer and, to assure that molecular weight of the oligomer is not increased, are terminated on the other end by an alkyl group in the range of 1–20 carbon atoms. The resulting N-alkyl amide is substantially unreactive with the carboxylic acid groups of the trunk copolymer.

It is believed that the graft copolymer of this invention exhibits the qualities which it exhibits, at least partially, because of intermolecular interaction between polyamide oligomer side chains. For that reason, it is preferred that the components in the graft polymerization should be present such that there are at least four oligomer side chain molecules available for grafting for each acid trunk molecule. The presence of such a ratio of components is recommended to statistically assure that substantially all trunk molecules will have at least two oligomer side chain molecules.

The grafting reaction is accomplished by establishing a reactive contact between the primary amine groups of the polyamide oligomer and the monocarboxylic acid groups of the trunk copolymer in the presence of neutralizing metal ions. Reactive contact is established by combining the components in a melt blend or a solution or by any other well known means. The preferred means for bringing the polyamide oligomer into reactive contact with carboxylic acid groups of the trunk copolymer is to melt the components together in a vacuum or other inert atmosphere. A roll mill or kneading mixer such as a Brabender mixer operating at about 200° to 300° and preferably 225° to 250° C. can be used. A vacuum extruder operating at those temperatures is preferred.

What forms an important and critical part of the present invention is the discovery that zinc-, cadmium-, and lead-neutralized monocarboxylic acid groups in an acid trunk copolymer operate to promote grafting reaction of the trunk copolymer with side chains of polyamide oligomers. Such grafting reaction has been found to be much more readily accomplished in the presence of metal neutralized carboxylic acid groups than when monocarboxylic acid groups on the trunk copolymer are not neutralized.

Although it is believed that some of the carboxylic acid groups must be neutralized before the polyamide oligomer will be grafted to the trunk copolymer with acceptable facility, the process of this invention can be conducted by simultaneous melt or solution combination of an unneutralized acid copolymer, an appropriate metal compound, and a polyamide oligomer. In that simultaneous combination, it is believed that the metal makes reactive contact with some of the carboxylic acid groups to neutralize them; and then the metals of the neutralized acid groups promotes reactive contact between carboxylic acid groups and the primary amine groups of the polyamide oligomer already present in the system, to yield the graft copolymer. The metal ions appear to act as catalysts or activators to make monocarboxylic acid groups on the trunk copolymer more reactive to grafting by the polyamide oligomer.

The graft polymer of this invention can be identified as such, rather than as a mere mixture or blend of polyamide oligomer and acid copolymer, by its clarity in the melt; its single, sharply defined, melt flow temperature substantially greater than that of the acid trunk component alone; and its retention of moduli at relatively high temperatures. Unreacted blends or mixtures of polyamides and acid copolymers are characteristically cloudy in the melt; exhibit the softening temperature of the unreacted acid copolymer; and exhibit moduli of substantially zero at about 100° C.

Along with the characteristics pointed out above, the graft copolymer of this invention can be identified as exhibiting two melting points under conditions of Differential Thermal Analysis (DTA). The graft copolymers of this invention exhibit DTA melting points at 80° to 115° C., characteristic of the acid trunk copolymer, and at above 150° C., ranging from 150° to 220° C., characteristic of the polyamide oligomer side chains. When the polyamide oligomer side chains are polycaprolactam, the side chain DTA melting point is at least 165° C., preferably 175° to 200° C.; and when the side chains are polylaurolactam, at least 150° C., preferably 150° to 170° C.

The graft copolymers exhibit a flexibility which is characteristic of the acid trunk copolymer component and a strength and toughness at moderately high temperatures which is characteristic of the polyamide side chain oligomers. Such combination of physical qualities, not found in mere blends of the components, makes the graft copolymer useful in manufacture of articles requiring such qualities. For example, films and tubes made from the grafting copolymers exhibit a utility extended into temperatures which would cause failure in such articles made from a blend of the materials. The graft copolymers are also useful as components in hot melt thermoplastic resin adhesives and as blending aids for polyethylene and polyamide resins.

DESCRIPTION OF THE PREFERRED EMBODIMENTS

In the following examples, percentages and parts are by weight unless stated to be otherwise.

In the characterization of the acid trunk copolymer, Melt Index is determined in accordance with the test of ASTM D-1238-73, Condition E or Condition A and then converted to an equivalent value for Condition E. The degree of neutralization of the acid trunk copolymer is determined by elemental analyses. In characterization of the polyamide oligomer, degree of polymerization (DP) is determined by end group analysis. The amine end groups are determined by titration with a strong acid, either in the presence of an indicator or by some instrumental means.

The melt flow temperature of the graft copolymer is determined by observation of the material placed on a heated steel block. The temperature of visible loss of elastic recovery from deformation in the graft copolymer is taken as the melt flow temperature. It is pointed out that this test is not extremely accurate and is used herein only to determine whether the graft reaction has been accomplished. A melt flow above the melting point of the acid trunk copolymer is indicative of grafting.

Torsion modulus is determined in accordance with the procedure described in "Anelastic and Dielectric Effects in Polymer Solids"; N. G. McCrum, B. E. Read, and G. Williams; John Wiley & Sons, New York (1967), at pages 192-195. Samples for testing are prepared by compression or injection molding, at about 225° to 250° C., bars having dimensions of about 12.7×1.27×0.32 centimeters (5×½×⅛ inches). To evaluate properties of the graft copolymer of this invention, torsion moduli were determined at 150° C.

Differential Thermal Analysis (DTA) is used to determine melting points of the graft copolymers on a molecular basis. DTA melting points represent the temperature of the endotherm peaks in a thermogram of a graft copolymer sample heated from room temperature at the rate of 20° C. per minute. Details of DTA methods are described in Differential Thermal Analysis by C. B. Murphy, R. C. MacKenzie, editor, Volume I, pages 643 to 671, Academic Press, New York (1970).

COMPARATIVE EXAMPLE A

In this example, for comparative purposes, 60 parts of an acid copolymer were combined with 40 parts of a polyamide oligomer by mixing pellets of the materials and then passing the mixture through a twin screw vacuum extruder. The barrel temperature of the extruder was about 250° C., the die temperature was about 225° C., and the pressure in the extruder was about $3 \times 10^4$ Pa (225 millimeters of mercury).

The acid copolymer was an unneutralized copolymer of ethylene with 11 percent methacrylic acid and exhibited a melt index of 100. The polyamide oligomer was polycaprolactam (nylon 6) with a DP of 10 and had n-butylamine as blocking end groups.

The extruded material was cloudy and remained cloudy on remelting. The extruded material exhibited a melt flow temperature of 103° C. indicating little or no grafting; and the material melted before a torsion modulus could be determined at 150° C.

COMPARATIVE EXAMPLE B

For comparative purposes, 60 parts of the acid copolymer of Example A treated to have 35 percent of the methacrylic acid groups neutralized by sodium, were combined with 40 parts of an n-butyl amine-terminated polycaprolactam (nylon 6) having a DP of 14 by mixing pellets of the materials and then passing the mixture through a twin screw vaccum extruder having a barrel at 250° C. and a die at 222° C. under a pressure of about $2.7 \times 10^4$ Pa (200 millimeters of mercury).

The acid copolymer can be neutralized by reaction with aqueous sodium hydroxide solution in a vacuum extruder.

As was the case for the material of Example A, the material of this Example B was cloudy in the melt and exhibited a low melt flow temperature indicating little or no grafting. The melt flow temperature for the material of this Example B was 95° C.

EXAMPLES 1-3

Three portions of the acid copolymer of Example A were mixed in a roll mill for about 10 minutes at about 200° C. with acetates of zinc, cadmium, and lead in amounts proper to neutralize 50 percent of the methacrylic acid groups. Seventy parts of each of the neutralized acid trunk copolymers were combined with 30 parts of an n-butyl amine-terminated polycaprolactam (nylon 6) having a DP of 6.8 by mixing pellets of the materials and then passing the mixture through a twin screw extruder with a barrel temperature of about 230° C., a die temperature of about 225° C., and a pressure of about $3 \times 10^4$ Pa (about 225 millimeters meters of mercury).

Although the extruding temperature is lower than that of Examples A and B and although the polyamide oligomer is of lower DP, the extruded material of these examples exhibited much improved physical qualities. All of these extruded materials were optically clear in the melt indicating a grafting reaction. The zinc-, cadmium-, and lead-neutralized products exhibited melt flow temperatures of 154°, 137°, and 149° C., respectively; and torsion moduli at 150° C. of 2.8, 4.8, and $1.3 \times 10^6$ Pa (2.8, 4.8, and $1.3 \times 10^7$ dynes per square centimeter), respectively. Note that temperature discrepancies between melt flow temperature and torsion moduli indicate additional grafting which is believed to occur during the molding of specimens for determination of torsion moduli.

Similar results and a similar grafted copolymer would be expected using an acid copolymer of ethylene and acrylic acid as the trunk copolymer. Likewise, similar results and similar grafted copolymers would be expected using a polylaurolactam (nylon 12) or other eligible alkyl amine-terminated nylon.

EXAMPLES 4 and 5

Two portions of an acid copolymer of ethylene and 12 percent methacrylic acid exhibiting a melt index of 13.5 were mixed in a roll mill for about 10 minutes at about 175° C. with acetate of zinc and lead in amounts proper to neutralize 50 percent of the methacrylic acid groups. Seventy parts of each of the neutralized acid trunk copolymers were combined with 30 parts of the polyamide oligomer of Examples 1-3 by mixing pellets of the materials and then masticating the materials on a roll mill for 10 to 20 minutes at about 225° C. The product of both reactions was clear in the melt. The zincand lead-neutralized products exhibited melt flow temperatures of 150° and 145° C., respectively; and torsion moduli at 150° C. of 0.8 and $2.7 \times 10^6$ Pa (0.8 and $2.7 \times 10^7$ dynes per square centimeter), respectively.

Similar results and similar grafted copolymers would be expected if the materials were combined in a kneading mixer, such as a Brabender mixer. Likewise, similar results and similar grafted copolymers would be expected if zinc or lead oxide or carbonate rather than acetate were used in the neutralization.

EXAMPLES 6-15

Neutralized acid copolymer was grafted with polyamide oligomer in accordance with details provided in the table, below. The acid copolymer was neutralized with zinc and the degree of neutralization is shown in the table, along with other details of the materials used.

ture of all of the trunk copolymers would be the same within a few degrees of 100° C.

We claim:

1. A process for making a graft copolymer comprising the steps of
   neutralizing some of the carboxylic acid groups on a trunk copolymer derived from ethylene and $\alpha,\beta$-ethylenically unsaturated monocarboxylic acid by reactive contact between the carboxylic acid groups and metal ions selected from the group consisting of zinc, cadmium, and lead and
   adding a polyamide oligomer in reactive contact with the carboxylic acid groups and in the presence of the metal ions in the trunk copolymer
   whereby the polyamide oligomer is grafted onto the trunk copolymer by an amino group on the oligomer to a carboxylic acid group on the trunk copolymer.

| Example | A | B | 6 | 7 | 8 | 9 | 10 |
|---|---|---|---|---|---|---|---|
| Acid Trunk Copolymer | | | | | | | |
| % Methacrylic acid | 11 | 11 | 12 | 12 | 12 | 12 | 15 |
| % Neutralization | 0 | 35 | 38 | 38 | 38 | 38 | 58 |
| Melt index | 100 | 100 | 13.5 | 13.5 | 13.5 | 13.5 | 60 |
| Polyamide Oligomer | | | | | | | |
| Nylon | 6 | 6 | 6 | 6 | 6 | 12 | 6 |
| DP | 10 | 14 | 23.9 | 6.8 | 23.9 | 10.1 | 23.7 |
| Terminating group | But. | But. | But. | But. | But. | Hex. | But. |
| Grafting Process | Ex | Ex | Ex | Ex | Ex | Ex | Ex |
| % Polyamide Oligomer | 40 | 40 | 20 | 30 | 50 | 25 | 30 |
| % Acid copolymer | 60 | 60 | 80 | 70 | 50 | 75 | 70 |
| Grafting Temp. °C. | 250 | 250 | 237 | 234 | 235 | 229 | 223 |
| Melt Flow Temp. °C. | 103 | 95 | 218 | 160 | 160 | 146 | 184 |
| Torsion modulus $\times 10^{-6}$ at 150° C., Pa | — | — | 6.4 | 2.5 | 5.2 | — | 6.4 |
| DTA melt peaks, °C. | | | | | | | |
| Trunk copolymer | — | — | 96–101 | 98–102 | 91–99 | 94–102 | 84–93 |
| Side Chain Oligomer | — | — | 206–213 | 185–213 | 203–210 | 155–160 | 212–219 |

*Ex is vacuum extruding

| Example | A | B | 11 | 12 | 13 | 14 | 15 |
|---|---|---|---|---|---|---|---|
| Acid Trunk Copolymer | | | | | | | |
| % Methacrylic acid | 11 | 11 | 15 | 9 | 9 | 12 | 9 |
| % Neutralization | 0 | 35 | 58 | 46 | 38 | 38 | 38 |
| Melt index | 100 | 100 | 60 | 10 | 10 | 13.5 | 10 |
| Polyamide Oligomer | | | | | | | |
| Nylon | 6 | 6 | 6 | 6 | 6 | 6 | 6 |
| DP | 10 | 14 | 12.9 | 6.8 | 24 | 14 | 7 |
| Terminating group | But. | But. | But. | But. | But. | But. | But. |
| Grafting process | *Ex | Ex | Ex | Ex | RM | Br | Bx |
| % Polyamide oligomer | 40 | 40 | 30 | 30 | 30 | 40 | 30 |
| % Acid copolymer | 60 | 60 | 70 | 70 | 70 | 60 | 70 |
| Grafting Temp. °C. | 250 | 250 | 227 | 228 | 225 | 250 | 235 |
| Melt Flow Temp. °C. | 103 | 95 | 157 | 155 | | | 158 |
| Torsion modulus $\times 10^{-6}$ at 150° C., Pa | — | — | 5.7 | 11 | 0.9 | 5 | 3 |
| DTA melt peaks, °C. | | | | | | | |
| Trunk copolymer | — | | 94–97 | 79–93 | 97 | — | 95 |
| Side chain | | | 100–107 | | | | |
| Oligomer | | | 206–213 | 188–197 | 208 | — | 187 |

*Ex is vacuum extruding
RM is roll milling
Br is kneading (Brabender)

Although the melt index of the acid trunk copolymer of Examples A and B is substantially higher than the melt indices of the trunk copolymers used in Examples 6-15, it would be expected that the melt flow tempera- 2. The process of claim 1 wherein the polyamide oligomer is a polylactam.

3. The process of claim 1 wherein the polyamide oligomer is derived from an omega-amino acid.

4. The process of claim 1 wherein molecules of the polyamide oligomer are terminated on one end by a primary amino group and are terminated on the other end by an N-alkyl amide group with alkyl having 1 to 20 carbon atoms.

5. The process of claim 1 wherein the polyamide oligomer has a degree of polymerization of 6 to 35.

6. The process of claim 1 wherein the polyamide oligomer has a degree of polymerization of 6 to 15.

7. The process of claim 1 wherein the polyamide oligomer is added in an amount of 20 to 75 weight percent of the graft copolymer.

8. The process of claim 1 wherein the polyamide oligomer is added in the amount of 30 to 40 weight percent of the graft copolymer.

9. The process of claim 1 wherein the neutralizing step is accomplished by intimate contact between molten trunk copolymer and a compound of the metal ions.

10. The process of claim 9 wherein the compound of the metal ions includes an anion selected from the group consisting of formate, acetate, hydroxide, oxide, nitrate, carbonate, and bicarbonate.

11. The process of claim 1 wherein the $\alpha,\beta$-ethylenically unsaturated monocarboxylic acid is methacrylic acid.

12. The process of claim 1 wherein the $\alpha,\beta$-ethylenically unsaturated monocarboxylic acid is acrylic acid.

13. The process of claim 1 wherein 15 to 80 percent of the carboxylic acid groups in the trunk copolymer are neutralized in the neutralizing step.

14. The process of claim 1 wherein 35 to 65 percent of the carboxylic acid groups in the trunk copolymer are neutralized in the neutralizing step.

15. The process of claim 1 wherein the number of unneutralized carboxylic acid groups remaining after the acid neutralizing step is at least as great as the number of primary amine groups in the polyamide oligomer added in the oligomer adding step.

16. A graft copolymer consisting essentially of a trunk copolymer derived from ethylene and $\alpha,\beta$-ethylenically unsaturated monocarboxylic acid having 15 to 80 percent of the monocarboxylic acid groups neutralized by a metal ion selected from the group consisting of zinc, cadmium, and lead and side chains derived from polyamide oligomer and grafted onto the trunk copolymer by an amino group on the oligomer to a carboxylic acid group on the trunk copolymer.

17. The copolymer of claim 16 wherein the $\alpha,\beta$-ethylenically unsaturated monocarboxylic acid is methacrylic acid.

18. The copolymer of claim 16 wherein the $\alpha,\beta$-ethylenically unsaturated monocarboxylic acid is acrylic acid.

19. The copolymer of claim 16 wherein the polyamide oligomer has a degree of polymerization of 6 to 35.

20. The copolymer of claim 16 wherein the polyamide oligomer is a polylactam.

21. The copolymer of claim 16 wherein molecules of the polyamide oligomer are terminated on ungrafted ends, by an N-alkyl amide group wherein the alkyl is 1 to 20 carbon atoms.

22. The copolymer of claim 16 wherein the polyamide oligomer is derived from an omega-amino acid.

23. The copolymer of claim 16 wherein the polyamide oligomer is present as 20 to 75 weight percent of the graft copolymer.

24. The copolymer of claim 16 wherein the polyamide oligomer is present as 30 to 40 weight percent of the graft copolymer.

25. The copolymer of claim 16 wherein the side chains are polycaprolactam and wherein the copolymer has two DTA melting points, one at 80° to 115° C. and the other at at least 165° C.

26. The copolymer of claim 25 wherein the melt flow temperature is above about 115° C.

27. The copolymer of claim 16 wherein the side chains are polylaurolactam and wherein the copolymer has two DTA melting points, one at 80° to 115° C. and the other at at least 150° C.

28. The copolymer of claim 29 wherein the melt flow temperature is above about 115° C.

29. A graft copolymer consisting essentially of a trunk copolymer of ethylene and $\alpha,\beta$-ethylenically unsaturated monocarboxylic acid and side chains of polyamide oligomer grafted onto the trunk copolymer by an amino group on the oligomer to a carboxylic acid group on the trunk copolymer wherein 15 to 80 percent of the monocarboxylic acid groups are neutralized by a metal ion selected from the group consisting of zinc, cadmium, and lead.

* * * * *